May 21, 1940.  F. P. MILLER  2,201,495
ROTARY CUTTER
Filed Nov. 16, 1937   2 Sheets-Sheet 1
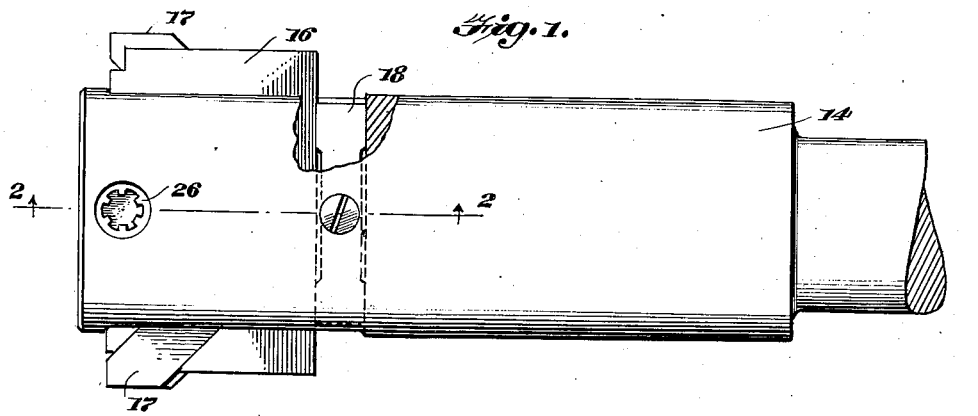
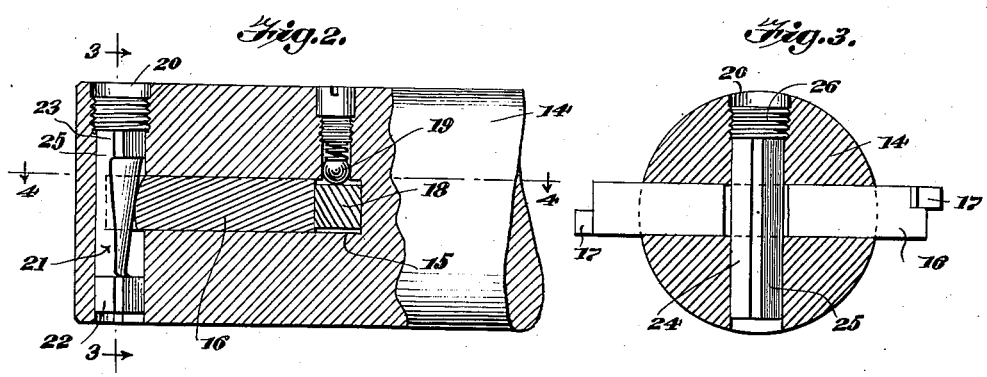
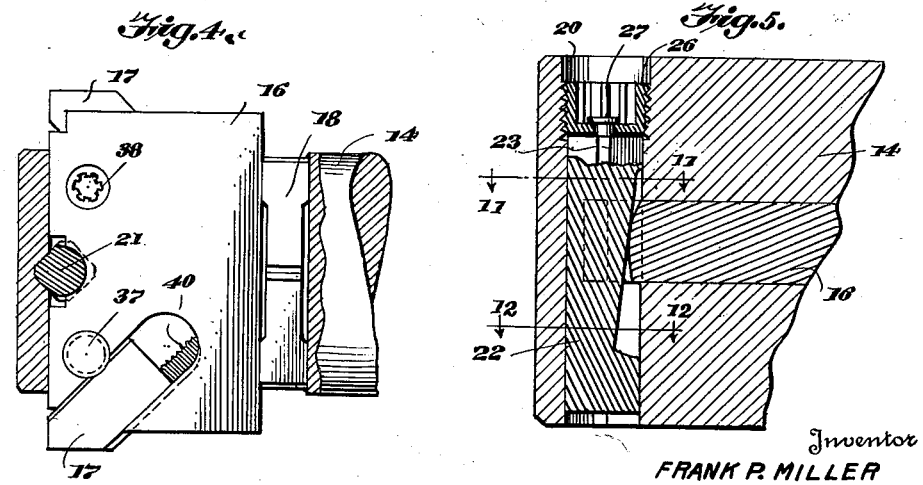
Inventor
FRANK P. MILLER
By E. F. Salter
Attorney May 21, 1940.　　　　F. P. MILLER　　　　2,201,495
ROTARY CUTTER
Filed Nov. 16, 1937　　　　2 Sheets-Sheet 2
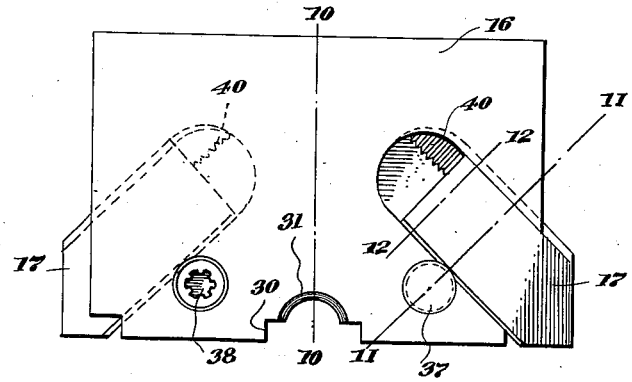
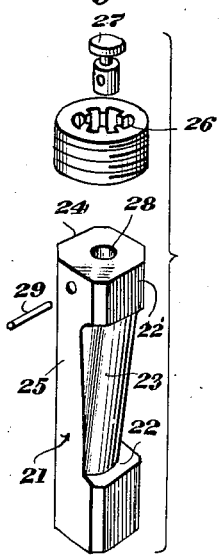
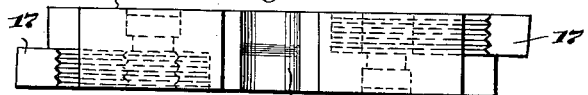
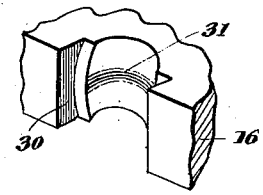
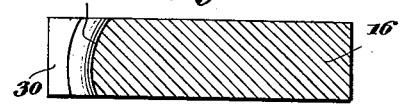
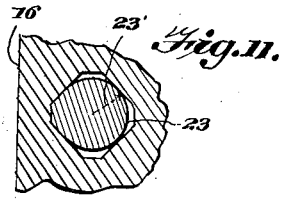
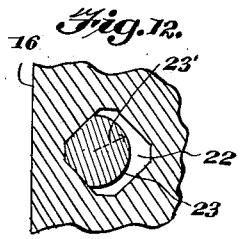
Inventor
FRANK P. MILLER Patented May 21, 1940

2,201,495

UNITED STATES PATENT OFFICE 2,201,495

ROTARY CUTTER

Frank P. Miller, Meadville, Pa.

Application November 16, 1937, Serial No. 174,879

6 Claims. (Cl. 77—56)

This invention relates to rotary cutters of the boring bar type, and is an improvement upon the invention disclosed in my prior United States Patent No. 2,021,668 of Nov. 19, 1935.

A primary object of the present invention is to provide an improved cutter block centering means including a block engaging centering key and cutter block having contacting or bearing surfaces curved in arcs that are mutually perpendicular, so arranged as to insure firm line contact between the block and key in a plane substantially parallel to and midway between the faces of the cutter block.

Another object is to provide an improved construction of centering key having angled faces easily machined for accurate seated engagement in a locating socket of the boring bar, to anchor the key against rotation on its axis and to dispose the axis of the key in direct intersection with the axis of the boring bar and perpendicular thereto.

Other objects will be readily apparent to those skilled in the art.

In the accompanying drawings which form a part of this application and in which like characters of reference are employed to designate like parts throughout the several views:

Figure 1 is a fragmentary elevation of a rotary cutter as constructed in accordance with the invention, parts of the boring bar being shown in section.

Figure 2 is an axial section through the bar on the line 2—2 of Figure 1, parts being in elevation.

Figure 3 is a section taken on line 3—3 of Figure 2.

Figure 4 is a section taken on the line 4—4 of Figure 2.

Figure 5 is a somewhat enlarged axial section taken through the outer end portion of the cutter, substantially as in Figure 2, a portion of the centering key being in elevation.

Figure 6 is an elevation of a cutter block forming a part of the invention.

Figure 7 is an end elevation of the block shown in Figure 6.

Figure 8 is a group perspective view of the centering key employed.

Figure 9 is a fragmentary perspective view of the cutter block edge as formed to engage the centering key.

Figure 10 is a section through the cutter block taken on the line 10—10 of Figure 6.

Figure 11 is a section on the line 11—11 of Figure 5.

Figure 12 is a section on the line 12—12 of Figure 5.

In the embodiment of the invention as herein disclosed the cutter comprises a boring bar 14 provided with a diametrical slot 15 which receives the cutter block 16 carrying the blades 17 and which is backed by a thrust receiving member 18. A spring detent 19 normally holds the thrust member 18 against movement diametrically of the bar but permits of its dislodgment when force is applied from one side of the slot, so that the thrust member may be removed to permit ready removal and replacement of the cutter block without disturbing the adjustment of the centering key. The location of the cutter block, its slot, the thrust member and the spring detent, are as shown and described in my aforesaid patent.

As seen in Figures 2 and 5, the cutter block slot 15 at its forward end intersects a perpendicular bore 20 which extends entirely through the boring bar with its axis intersecting the axis of the bar. Figure 4 shows that the bore 20 is of substantially square cross section arranged with one of its diagonals coincident with the axis of the boring bar. The bore is internally threaded adjacent one end, the threaded portion being of circular cross section.

The bore 20 receives the centering key 21 which, as seen in Figure 8, has a squared inner end portion 22 and a squared outer end portion 22' machined for a snug fitting engagement in the bore. Between the ends of the key its shank, throughout approximately one half of its face area, is rounded off from the outer end to the inner end portion, thus forming an inner bearing face portion 23 of approximately semi-circular cross-section from the squared outer end of the key to its squared inner end 22. The portion 23 is curved on a radius 23' which is constant throughout, the axis of the curved portion being angled with respect to the axis of the key. The other half of the key is formed with flat angled faces from end to end, as at 24 and 25, which fit snugly in the forward half of the bore and together with the squared end portions 22 and 22' prevent rotation of the key on its axis.

At its outer end the centering key 21 has swivelled thereon an adjusting nut 26 in the form of an externally threaded sleeve engaged in the threaded portion of the bore 20. The nut is secured on the key by means of a swivel pin 27 seated in an axial key socket 28 and anchored in the usual manner by means of an anchor pin 29. The nut is formed on its inner face portion for operative engagement with an appropriate tool.

The cutter block 16 has its forward straight edge recessed as at 30 to take over the shank of the centering key with sufficient clearance to permit floating of the block when work requirements demand a floating mount. The recess is bisected by the center line of the block.

A feature of the present invention resides in the fact that the inner wall of the recess 30 is formed with an additional arcuate, segmental shallow recess 31 extending through the block 16 from face to face thereof. As best seen in Figures 7 and 10, the block edge throughout the extent of the recess 31 is curved from face to face of the block, substantially in a curve whereof the axis is in a plane perpendicular to the axis of the portion 23 of the centering key.

In assembling the tool, the cutter block is positioned with its arcuate recess 31 engaging the curved shank portion 23 of the centering key, and as the adjusting nut 26 is advanced the key moves inwardly in the bore 20, the taper of the portion 23 causing the block to be wedged tightly against the thrust member 18. At the same time, due to the surface curvature of both the key portion 23 and the face of the recess 31, there will result a full bearing contact between block and centering key over the entire extent of the recess 31 along a line substantially midway between the block faces. The curve of the block edge along the recess 31 assures such line contact for, in effect, the material of the block is relieved away from the shank of the key to clear the tapered surface.

A further important feature of this invention resides in the facility with which the centering key may be adjusted to bring the cutter block accurately into dead center relative to the axis of the boring bar in order to overcome inaccuracy in production. The key 21 is centered by removing the required amount of metal from either of the flat faces 24 or 25, a simple operation and one that requires no highly accurate mathematical calculations. This method of adjustment is highly advantageous in overcoming slight inaccuracies that may be experienced in producing the assembled tool, and in case the bar should be sprung out of line for any reason. The key once adjusted may be maintained at the same adjustment without further regulation, and the cutter block may be removed and replaced without disturbing the set of either the blades or the centering key.

In assembling the cutter, where floating action of the cutter block is desired, the nut 26 is retracted to move the centering key outwardly in the bore 20. The incline of the portion 23 gives a clearance with respect to the block edge recess 31 which permits floating of the block.

When the nut 26 is advanced the centering key 21 moves inwardly in its bore to engage the face portion 23 with the wall of the recess 31, clamping the block against movement relative to the boring bar. As the arcs of curvature of the key portion 23 and the wall of recess 31 are mutually perpendicular, the bearing contact occurs always as a line contact from side to side of the recess 31 and irrespective of any slight inaccuracy in the theoretically perpendicular relationship of the axis of the centering key relative to the plane of the cutter block.

Contiguous to each blade the body of block 16 is provided from one face to the other with a cylindrical bore receiving locking screw member 37 provided with a tool engageable socket 38. At their inner ends the blades 17 are engaged by thrust screws 40, as in my prior Patent No. 2,076,663 of April 13, 1937.

Having thus described the invention, what is claimed is:

1. In a cutting tool, a support having a slot, a cutter block in said slot, a centering key in said support and movable transversely of the block, and one edge of said block and a portion of said key having contacting bearing surfaces curved on arcs that are mutually perpendicular at all points of contact.

2. A centering key for rotary cutters, comprising a shank having a portion substantially square in cross section at each end, said shank also having an intermediate longitudinal portion thereof having a face curved as the segment of a cylinder whereof the axis is inclined relative to the key axis.

3. A rotary cutter comprising a boring bar having an axial slot diametrically disposed therein, a cutter block in said slot, a centering key positioning bore of substantially square cross section extending through said boring bar and intersecting the axis thereof perpendicular thereto, said slot opening at its forward end into said bore, the forward edge of said block having at its center a segmental recess having its wall curved to project into the centering key bore, a centering key adjustable in said bore transversely of said block, said key having flat longitudinal faces contacting the bore walls to prevent rotation of the key on its axis, said key having also a curved face portion adapted to bear against the curved wall of said cutter block recess, the curvature of the cutter block recess wall being in conformity to the curvature of the face portion of the key from end to end of the recess, and said curved face portion of the key being inclined longitudinally of the key relative to its axis.

4. A rotary cutter comprising a boring bar having an axial slot diametrically disposed therein, a cutter block in said slot, said boring bar having a bore substantially square in cross section extending therethrough and intersecting the axis thereof perpendicular thereto, said cutter block extending part way across the bore at one edge and having an edge recess of segmental form coaxial with the bore axis, a centering key in said bore and adjustable along its axis transversely of the cutter block and through its segmental recess, said key having a pair of plane longitudinal faces convergent in the axis of the bar at a point opposite the segmental recess of the cutter block and contacting the bore walls to prevent rotation of the key on its axis, said key also having a longitudinally extending face portion curved throughout in an arc whose axis is inclined relative to the axis of the key, the curved face extending uninterruptedly around substantially half the perimeter of the key, the wall of said cutter block recess being curved circumferentially of the key in conformity thereto throughout and also being curved throughout from face to face of the cutter block in an arc which is, at any point along the length of the recess, perpendicular to the arc of curvature of the key.

5. In a rotary cutter comprising a boring bar slotted axially and mounting in the slot a cutter block, a centering key in the bar and non-rotatively mounted therein for movement on the axis of the key, the axes of said bar and key intersecting at right angles, said key having a longitudinal face portion curved transversely and bearing against the cutter block, said cutter block having a recess receiving the face portion of the key and curved in conformity thereto, and said cutter block recess also being curved from one face of the block to the other throughout the length of the recess.

6. In a rotary cutter comprising a boring bar slotted axially and mounting in the slot a cutter block, a centering key non-rotatively mounted in the bar and movable therein on the axis of the key, the axes of said bar and key being perpendicular, said key having a longitudinally extending portion thereof curved transversely on an axis inclined with respect to the axis of the key and bearing against the cutter block, said cutter block having in one edge a segmental recess receiving the curved portion of the key and curved in conformity thereto circumferentially of the key, and the wall of said recess being bowed radially toward the key in an arc which is perpendicular to the arc of curvature of the key at any point from end to end of the recess.

FRANK P. MILLER.